United States Patent Office 2,889,382
Patented June 2, 1959

2,889,382

PROCESS FOR REMOVING META-XYLENE FROM MIXTURES OF XYLENE ISOMERS INCLUDING THE PARA ISOMER BY MEANS OF CHLORINATION

Herbert C. Wohlers, Syracuse, N.Y., assignor to Allied Chemical Corporation, New York, N.Y., a corporation of New York No Drawing. Application April 1, 1957
Serial No. 649,647

4 Claims. (Cl. 260—674)

This invention relates to a process for the removal of meta-xylene from mixtures thereof with para-xylene, in the presence or absence of the ortho-xylene, and to the production of a monochloro-meta-xylene product together with a mixed xylene residue enriched with respect to para-xylene.

Commercial xylenes obtained from coal tar and petroleum sources are usually mixtures of the ortho, meta and para isomers, together with small quantities of ethyl benzene and other impurities. The composition of a typical commercial xylene mixture is shown in Table I below, together with physical properties of the main components.

TABLE I

*Composition of a typical commercial xylene and physical properties of its components*

| Component | Percent by weight | Boiling point, °C. | Melting point, °C. |
|---|---|---|---|
| Meta-xylene | 50 | 139.1 | −47.9 |
| Para-xylene | 20 | 138.4 | 13.3 |
| Ortho-xylene | 18 | 144.4 | −25.2 |
| Ethyl benzene | 7 | 136.2 | −95.0 |
| Other impurities | 5 | | |

Separation of ortho-xylene from the meta and para isomers in such mixtures may be accomplished by careful fractionation, since its boiling point is sufficiently different from those of the other components. Meta and para-xylenes, however, having very close boiling points, cannot economically be separated from each other by fractionation, and separation has been effected in the past by low temperature crystallization of the para isomer. In such crystallization processes, the presence of high proportions of ortho and meta-xylene results in poor yields of para-xylene, even when operating at temperatures as low as −70° C. since the xylene isomers form eutectic mixtures. Thus, removal of all or part of the meta-xylene from the para isomer would obviously tend to increase the yield of para on crystallization. Such removal, however, has presented great difficulty, and has been accomplished by multi-stage extraction with a hydrogen fluoride-boron trifluoride solvent, and by a sulfonation hydrolysis process, both of which are expensive.

It is an object of the present invention to provide an economic process for removing at least a substantial proportion of meta-xylene from mixed xylenes containing it in admixture with para-xylene.

A further object of the invention is to provide a process for preparing a mixture of xylenes enriched with respect to para-xylene from mixtures of xylenes containing para-xylene in admixture with substantial proportions of meta-xylene.

A still further object of the invention is to provide a process for producing monochloro-meta-xylene in high degree of purity from mixed xylenes containing appreciable proportions of meta-xylene together with appreciable quantities of para-xylene, in the presence or absence of ortho-xylene.

These and other objects are accomplished according to my invention, wherein mixed xylenes containing at least about 10% by weight of meta-xylene, together with para-xylene, with or without ortho xylene, are contacted, under conditions promoting nuclear substitution, with an amount of gaseous chlorine not in excess of the theoretical amount required to monochlorinate all the meta-xylene present in the mixture.

The success of my invention is made possible by the discovery that, under the reaction conditions as defined, when mixed xylenes are contacted with chlorine gas, the chlorine first reacts selectively and preferentially with the meta-xylene to the substantial exclusion of reaction with either ortho or para-xylene so that the preponderant portion of the meta-xylene may be mono-chlorinated before appreciable quantities of ortho or para-xylene react. Since the resulting monochloro-meta-xylene has a boiling point of 18.5°–184.7° C. at 760 mm. Hg, it may readily be separated from the unchlorinated ortho and para-xylenes in the mixture by simple fractionation, leaving a product enriched with respect to the ortho and para isomers.

In carrying out the chlorination treatment according to my invention, the mixed xylenes may be chlorinated as such, or may first be fractionated to separate part or all of the ortho-xylene if desired. A suitable catalyst of the type promoting nuclear substitution and inhibiting chain chlorination, for example, tin tetrachloride, is first added to the xylene mixture. Chlorine gas is next introduced rapidly into the mixture in the absence of light, and preferably with agitation. The chlorine thus introduced acts to monochlorinate the meta-xylene to the substantial exclusion of the ortho and para-xylenes in the mixture. Chlorine introduction is continued until the desired degree of meta-chlorination has been reached, depending on the objects of the particular chlorination reaction as discussed hereinafter.

When the chlorination reaction is complete, or has proceeded to the desired point, the reaction mixture may be washed with a dilute aqueous acid to remove the chlorination catalyst, and with a mild alkaline solution such as aqueous sodium bicarbonate to neutralize its acidity. It is then fractionated to separate the monochloro-meta-xylene (B.P. 184.5–184.7° C.), together with the small quantities of monochloro-ortho-xylene (B.P. 192.0–192.3° C.) and monochloro-para-xylene (B.P. 184.0° C.) formed in the reaction.

The residual mixed xylenes at this stage are markedly depleted of meta-xylene, and in this less contaminated form are in more favorable condition for recovery of the other two isomers by conventional means, e.g. fractionation to separate ortho-xylene, and fractional crystallization of the para isomer. Thus, for example, after removal of about 50% of the meta-xylene from a commercial xylene mixture of the composition indicated in Table I, a mixture is obtained having only about 33% of meta-xylene, and correspondingly higher percentages of ortho and para-xylenes, i.e. about 26% para-xylene. When chlorination of 75% of the meta isomer is effected, the residual mixture will contain only about 20% of meta-xylene and about 32% of the para isomer. When ortho-xylene has been removed by fractionation, either before or after the chlorination step, the proportion of the para isomer in the meta-depleted residues is proportionately higher. Upon fractional crystallization of such mixtures, the para isomer is obtained in considerably higher yields than from commercial xylenes and the fractionations can be carried out at higher temperatures as a larger amount of the pure para precipitates before the eutectic points are reached.

My chlorination treatment may be carried out on the commercial mixed xylenes, or preferably, ortho-xylene may first be at least partially removed by fractionation as is customarily carried out. If this is done, more effective separation of meta and para-xylenes may be accomplished. My process is applicable to mixed xylenes containing at least about 10% meta-xylene, and at least about 10% para-xylene. Ortho-xylene may be present or absent. Mixtures containing as high as 90% meta-xylene together with the para isomer may profitably be chlorinated selectively according to my invention to produce substantially pure monochloro-meta-xylene and to provide a concentration of the para isomer in the residue. My process is particularly applicable to commercial xylenes as such, or to such mixtures from which ortho-xylene has been removed, for example to mixtures containing between about 30% and about 75% meta-xylene and between about 10% and about 30% para-xylene.

The degree of selective chlorination employed will depend on the object of the particular treatment. Thus, if the object is to produce a residual mixed xylene product low in meta isomer, quantities of chlorine up to 100% of the amount theoretically required to monochlorinate the meta-xylene in the mixture (i.e. a mol ratio of 1:1) may be introduced into a typical xylene mixture with loss of only a few percent (e.g. 5–10%) of the ortho and para isomers to their chlorinated products. If, on the other hand the object of the particular chlorination is to provide a monochloro-meta-xylene of high purity, lesser quantities of chlorine will be introduced, for example, up to about 90% of the combining equivalent of the total meta-xylene in the mixture, to obtain purities of 95% and higher of monochloro-meta-xylene. The purity of the resulting monochloro-meta-xylene (a mixture of the 4-chloro- and 2-chloro isomers in which the 4-chloro-meta-xylene predominates), will be determined chiefly by the total amount of chlorine introduced relative to the meta isomer content, although it may be influenced to some extent by the temperature employed, lower temperatures producing a purer monochlor-meta-xylene than higher temperatures. The purity of the resulting mono-chloro-meta xylene will also be influenced to some extent by the concentration of meta-xylene in the starting mixture, mixtures with higher meta-xylene contents yielding purer monochloro-meta-xylene products, and by the nuclear aromatic chlorination catalyst used. Amounts of chlorine less than about 25% (molal basis) of the total meta-xylene in the mixture, however, while producing higher purity monochloro-meta-xylene also produce such small yields, and result in such slight concentration of the para-xylene component as not to be ordinarily economically practicable. In general, therefore, I prefer to introduce chlorine in molal proportion at least about 25%, preferably between about 50% and about 90%, of the total meta-xylene in the mixture to serve the dual purpose of providing a reasonably high purity monochloro-meta-xylene (about 95% or higher) and to concentrate the other xylene isomers substantially, particularly, para-xylene.

As catalyst I may use any of the conventional chlorination catalysts adapted to promote nuclear chlorination and to inhibit side chain chlorination. Examples of such catalysts are tin tetrachloride, ferric chloride, a mixture of ferric chloride and sulfur, iodine, antimony pentachloride, and the like. Usually, small quantities of catalyst are sufficient, quantities between about 0.5% and about 1.5% based on the weight of the meta-xylene present usually being satisfactory. As is customary in the art of nuclear aromatic chlorination, addition of a catalyst may be omitted if iron chlorination apparatus is used, the catalyst then being small amounts of iron chloride coming from the apparatus.

The temperature of the reaction is not unduly critical but preferably should be maintained as low as conveniently possible, since high temperatures tend to promote side chain chlorination, and to reduce the purity of the monochloro-meta-xylene formed. Ordinary room temperatures (Ca 25° C.) are satisfactory and temperatures down to that at which solidification or crystallization begins may be employed. In general, temperatures between about minus 25° C. and about plus 60° C. are satisfactory. Higher temperatures may be used as long as substantial amounts of side chain chlorination are avoided. Light should preferably be excluded as its presence tends to promote side chain chlorination.

Rate of introduction of chlorine is not critical since the reaction of chlorine with the meta-xylene is so rapid as to be almost instantaneous. Thus any convenient rate is suitable, the upper limit of chlorine introduction depending only on the mechanics of the apparatus.

The following specific examples further illustrate my invention. Parts are by weight except as otherwise noted.

EXAMPLE 1

To 250 parts of a xylene mixture having the following composition in weight percent

| | |
|---|---|
| Meta-xylene | 50 |
| Para-xylene | 21 |
| Ortho-xylene | 21 |
| Ethyl benzene | 8 |
| | 100 | was added 1.43 parts of tin tetrachloride as catalyst in the chlorination vessel. While excluding light from the vessel and holding the mixture at 25° C., gaseous chlorine was passed into the mixture at a rate of 0.76 part per minute until 42 parts had been absorbed, an amount theoretically sufficient to react with 50% of the meta-xylene in the mixture, i.e. a period of 55 minutes.

The resulting reaction mixture was washed with water, neutralized with 5% sodium bicarbonate solution and washed again with water. The mixture was then dried with anhydrous magnesium sulfate and fractionally distilled yielding 174 parts of mixed xylenes boiling from 136.6° to 150° C., 16 parts of an intermediate fraction boiling from 150° C. to 183.5° C., and 59 parts of monochloro-meta-xylene boiling from 183.5° to 184.3° C. Analysis showed the monochloro-meta-xylene fraction contained 95.6% monochloro-meta-xylene, 3.0% monochloro-para-xylene and 1.4% monochloro-ortho-xylene, corresponding to 30.4% of the meta-xylene in the original mixture.

The residual xylene mixtures when combined had approximately the weight percentage composition shown in Table 2 below.

TABLE 2

| | |
|---|---|
| Meta-xylene | 33.3 |
| Para-xylene | 28.0 |
| Ortho-xylene | 28.0 |
| Ethyl benzene | 10.7 |
| | 100.0 |

EXAMPLE 2

The xylene mixture of Example 1 was subjected to a second chloroination similar in all respects to that employed in Example 1 except that the temperature of the mixture was held during chlorination at minus 20° C.

Upon fractionation of the resulting mixture there was obtained a first fraction boiling from 136.6 to 142.2° C.; an intermediate fraction boiling from 142.2 to 184.2° C.; and a final monochloro-meta-xylene fraction boiling from 184.2 to 184.6° C. Analysis showed the monochloro-meta-xylene fraction contained 97.6% monochloro-meta-xylene, 1.7% monochloro-para-xylene and 0.7% monochloro-ortho-xylene.

EXAMPLES 3-9

A series of xylene mixtures were selectively chlorinated to illustrate the use of different catalysts, different temperatures and different degrees of chlorination. In carrying out the chlorinations, the catalyst was added to the xylene mixture and gaseous chlorine passed in while excluding light. Cooling was applied to maintain the desired chlorination temperature. After completion of the chlorination, the mixture was washed with 3N aqueous hydrochloric acid to remove the catalyst, then with water, and finally with 5% aqueous sodium bicarbonate.

After drying with anhydrous magnesium sulfate, the reaction mixture was fractionated. A mixed xylene cut was taken up to a temperature of about 145° C.; an intermediate cut from about 145° C. to about 183.5° C. and the monochloro-meta-xylene cut from about 183.5° C. to about 186.0° C.

Data showing conditions and results of the several runs are set forth in Table II below.

purity of the monochloro-meta-xylene was 99.3%. This chlorination obviously could have proceeded much further before seriously affecting the monochloro-meta-xylene purity.

With regard to para-xylene separation, the feeds used in runs 3-8 will give paraxylene in 67% yeild upon cooling to —85° F., below which point the meta-xylene starts to crystallize from the mixture. The mixed xylene cut from run 3, however, yields 75% para-xylene upon cooling to —80° F. (in this case the ortho-xylene eutectic with para-xylene is reached). With the run 8 xylenes, yields are 73% para-xylene, and with this composition the eutectic temperature (with ortho-xylene) is —65° F. The ability to obtain higher yields of para-xylene at higher temperatures in this very low temperature range is of obvious economic importance.

The feed xylene of run 9 is a eutectic mixture of meta- and para-xylene from which pure para-xylene cannot be separated. The mixed xylene cut, however, gives para-

TABLE II

Selective chlorination of meta-xylene mixtures

| Example | 3 | 4 | 5 | 6 | 7 | 8 | 9 |
|---|---|---|---|---|---|---|---|
| Reactants: | | | | | | | |
| Catalyst | SnCl₄ | SnCl₄ | SnCl₄ | FeCl₃ | FeCl₃+S | I₂ | SnCl₄ |
| Weight catalyst used (g.) | 1.43 | 1.43 | 1.43 | 0.885 | ¹ 1.14 | 3.29 | 17.0 |
| Weight xylenes used (g.) | 250 | 250 | 250 | 250 | 250 | 250 | 3,000 |
| Xylene composition— | | | | | | | |
| Ortho percent | 21 | 21 | 21 | 21 | 21 | 21 | 0 |
| Meta do | 50 | 50 | 50 | 50 | 50 | 50 | 86.4 |
| Para do | 21 | 21 | 21 | 21 | 21 | 21 | 13.6 |
| Ethylbenzene do | 8 | 8 | 8 | 8 | 8 | 8 | 0 |
| Weight chlorine used (g.) | 39.2 | 36.8 | 67 | 67 | 67 | 65.5 | 1,430 |
| Degree of chlorination based on meta-xylene percent | 47 | 44 | 80 | 80 | 80 | 78.4 | 82.9 |
| Reaction temperature (° C.) | 25 | —20 | 25 | 25 | 25 | 25 | 25–30 |
| Products: | | | | | | | |
| Weight xylene cut (g.) | 173.8 | 184.9 | 146.1 | 136.2 | 133.0 | 137.2 | 792.1 |
| Calculated xylene cut composition— | | | | | | | |
| Ortho percent | 27.0 | 26.8 | 33.9 | 34.1 | 34.0 | 34.6 | 0 |
| Meta do | 35.9 | 36.5 | 19.9 | 19.4 | 19.1 | 18.3 | 51.7 |
| Para do | 26.6 | 26.5 | 32.9 | 33.2 | 33.5 | 33.8 | 48.3 |
| Ethylbenzene do | 10.5 | 10.2 | 13.3 | 13.3 | 13.4 | 13.3 | 0 |
| Weight intermediate cut (g.) | 15.7 | 10.8 | 12.9 | 8.0 | 14.2 | 11.4 | 39.7 |
| Weight monochloro-meta-xylene cut (g.) | 58.7 | 60.7 | 100.5 | 94.1 | 85.5 | 91.4 | 2,733 |
| Monochloro-meta-xylene cut composition— | | | | | | | |
| 4-chloro-meta-xylene percent | 65.8 | 64.8 | 66.9 | 76.9 | 81.1 | 75.1 | 72.9 |
| 2-chloro-meta-xylene do | 29.8 | 32.8 | 28.1 | 18.8 | 15.1 | 22.3 | 26.4 |
| Monochloro-para-xylene do | 3.0 | 1.7 | 3.3 | 2.9 | 2.3 | 1.9 | 0.7 |
| Monochloro-ortho-xylene do | 1.4 | 0.7 | 1.7 | 1.4 | 1.5 | 0.7 | Nil |
| Weight residue (g.) | 13.0 | 10.5 | 20.1 | 19.8 | 15.5 | 22.4 | 43.6 |

¹ 22% sulfur and 78% FeCl₃.

The effect of reaction temperature on the purity of the monochloro-meta-xylene cut is shown by comparision of runs 3 and 4. At —20° C., the monochloro-meta-xylene cut contained 97.6% monochloro-meta-xylene, while at 25° C. the purity was 95.6% monochloro-meta-xylene.

The type of catalyst used influences the selectively of the chlorination. With iodine as the catalyst (run 8), the monochloro-meta-xylene cut contained 97.4% monochloro-meta-xylene, as compared with the 95.0% monochloro-meta-xylene found in run 5 which was run under identical conditions except for the use of tin tetrachloride as the catalyst. The catalyst also affects the proportion of the 4-chloro- and 2-chloro-meta-xylene isomers found. The highest proportion of 4-chloro-meta-xylene was formed with a ferric chloride-sulfur mixture (run 7), as compared with the lowest formed by tin tetrachloride.

Degree of chlorination has only a slight effect on the monochloro-meta-xylene purity when operating in the 47–80% chlorination range (compare runs 3 and 5) with a 50% meta-xylene content in the starting xylene. Monochloro-meta-xylene purity would, however, drop at an increasing rate as 100% of theoretical chlorination is reached.

The effect of starting concentration of meta-xylene on the purity of the monochloro-meta-xylene is shown in run 9 in which a 86.4% meta-xylene feed was used. Although the chlorination was 82.9% of theoretical, the xylene in 83% yield at —65° F. illustrating the advantage of separating para-xylene after removal of ortho-xylene by fractionation and meta-xylene by selective chlorination.

The monochloro-meta-xylene produced according to the invention is useful in the preparation of monochloro-isophthalic acid which is useful as a monomer in the preparation of polyester resins. The para-xylene separated from the residual mixed xylenes is useful in the manufacture of terephthalic acid polyester resins, while ortho-xylene is useful in the manufacture of phthalic anhydride, used in the preparation of plasticizers, resins, etc.

While the above describes the preferred embodiments of my invention, it will be understood that departures may be made therefrom within the scope of the specification and claims.

I claim:

1. The process for producing a mixture of xylene isomers enriched in para-xylene, from xylene mixtures containing at least about 10% of meta-xylene and at least about 10% of para-xylene, which comprises introducing gaseous chlorine into said mixture in the presence of a nuclear chlorination catalyst in the substantial absence of light, in molal proportion at least about 25% but not in excess of 100% of the meta-xylene present, and separating the monochloro-meta-xylene thus produced, from the reaction mixture.

2. The process according to claim 1 wherein the catalyst is tin tetrachloride.

3. The process for producing a mixture of xylene isomers enriched in para-xylene from xylene mixtures containing between about 30% and about 75% meta-xylene and between about 10% and about 30% para-xylene, which comprises introducing gaseous chlorine into said mixture in the presence of a nuclear chlorination catalyst in the substantial absence of light at temperatures between about minus 25° C. and about plus 60° C., in molal proportion between about 50% and about 90% of the meta-xylene present, separating the monochloro-meta-xylene thus produced, from the reaction mixture by distillation and thereafter separating para-xylene from the residue by fractional crystallization.

4. A process for producing a mixture of xylene isomers enriched in para-xylene and ortho-xylene which comprises introducing into a commercial xylene mixture containing approximately 50% meta-xylene, approximately 20% para-xylene and approximately 20% ortho-xylene in the substantial absence of light, and in the presence of a nuclear chlorination catalyst, gaseous chlorine at temperatures between about minus 25° C. and about plus 60° C. in molal proportion between about 50% and about 90% of the meta-xylene present, and thereafter separating the resulting monochloro-meta xylene from the reaction mixture by distillation.

References Cited in the file of this patent

UNITED STATES PATENTS

| | | |
|---|---|---|
| 1,741,305 | Jaeger | Dec. 31, 1929 |
| 2,511,711 | Hetzner et al. | June 13, 1950 |
| 2,801,271 | Schlatter | July 30, 1957 |

OTHER REFERENCES

Brewster: Organic Chemistry, 2nd ed., 1953, Prentice-Hall, Inc. New York, pages 497 and 518.

UNITED STATES PATENT OFFICE
CERTIFICATE OF CORRECTION

Patent No. 2,889,382                                        June 2, 1959

Herbert C. Wohlers

It is hereby certified that error appears in the printed specification of the above numbered patent requiring correction and that the said Letters Patent should read as corrected below.

Column 2, line 21, for "18.5°-184.7° C." read -- 184.5°-184.7° C.--; column 3, line 66, for "anitmony" read -- antimony --; column 5, line 54, for "selectively" read -- selectivity --; column 6, line 6, for "yeild" read -- yield --.

Signed and sealed this 3rd day of November 1959.

(SEAL)
Attest:

KARL H. AXLINE
Attesting Officer

ROBERT C. WATSON
Commissioner of Patents